United States Patent [19]

Makarov et al.

[11] Patent Number: 4,505,417

[45] Date of Patent: Mar. 19, 1985

[54] MILL FOR MANUFACTURING BODIES OF MULTILAYER HIGH-PRESSURE VESSELS

[76] Inventors: Viktor M. Makarov, ulitsa Sakko i Vantsetti, 58, kv. 35, Sverdlovsk; Boris E. Paton, ulitsa Chkalova, 41a, kv. 26, Kiev; Nikolai K. Globin, ulitsa Griboedova, 20, kv. 64, Sverdlovsk; Viktor G. Usenko, ulitsa Lermontova, 295, kv. 9; Enver R. Khismatulin, ulitsa 4 Zheleznodorozhnaya, 46b, kv. 16, both of Irkutsk; Boris G. Ziselman, ulitsa Inzhenernaya, 71, kv. 45; Petr G. Serov, ulitsa Griboedova, 15, kv. 16, both of Sverdlovsk; Marat M. Shel, ulitsa Kievskaya, 4, kv. 15, Irkutsk; Ovshiya O. Rozenberg, ulitsa Cheljuskintsev, 15, kv. 40, Kiev, all of U.S.S.R.

[21] Appl. No.: 422,900
[22] PCT Filed: Jan. 15, 1981
[86] PCT No.: PCT/SU81/00002
   § 371 Date: Sep. 9, 1982
   § 102(e) Date: Sep. 9, 1982
[87] PCT Pub. No.: WO82/02350
   PCT Pub. Date: Jul. 22, 1982
[51] Int. Cl.³ .............................................. B23K 31/06
[52] U.S. Cl. ...................................... 228/17.7; 228/184
[58] Field of Search ................ 228/48, 17.7, 143, 144, 228/145, 184; 242/7.23

[56] References Cited

U.S. PATENT DOCUMENTS

| | | | |
|---|---|---|---|
| 2,600,630 | 6/1952 | Fergusson | 29/446 |
| 3,221,401 | 12/1965 | Scott et al. | 242/7.23 |
| 3,425,118 | 2/1969 | Dobell et al. | 228/17.7 |
| 3,432,914 | 3/1969 | Huck | 228/145 |
| 3,549,077 | 12/1970 | Huck | 228/145 |
| 3,568,302 | 3/1971 | Oehler et al. | 228/145 |
| 3,580,461 | 5/1971 | Dobell et al. | 228/17.7 |
| 3,661,314 | 5/1972 | Tselikov et al. | 228/145 |

FOREIGN PATENT DOCUMENTS

| | | |
|---|---|---|
| 1222456 | 2/1967 | Fed. Rep. of Germany . |
| 517440 | 7/1976 | U.S.S.R. . |
| 525494 | 11/1976 | U.S.S.R. . |
| 940888 | 7/1982 | U.S.S.R. .............................. 17.7/ |

Primary Examiner—Kenneth J. Ramsey
Attorney, Agent, or Firm—Fleit, Jacobson, Cohn & Price

[57] ABSTRACT

A mill for manufacturing bodies of multilayer high-pressure vessels comprises rotators (3) of the body (1) of the high-pressure vessel, which have the butt end portions of the body (1) of the high-pressure vessel secured therein. The body (1) of the high-pressure vessel is surrounded by a portal (5) capable of moving along the body (1) of the vessel. An upper platform (8) of the portal (5) carries a technological line (15) for preparation of the steel strip for its winding onto a central pipe (16) of the body (1) of the vessel, the steel strip (2) being supplied from a coil (18). A crossbar (9) secured to uprights (10) of the portal (5) carries an arrangement (32) for tensioning the steel strip, which can move along the crossbar (9) and from which the steel strip (2) is supplied to the upper generatrix of the body (1) of the vessel in such a manner that a free loop (30) of the steel strip (2) allowing for a turn of the arrangement (32) for tensioning the steel strip in the horizontal plane is formed between the technological line (15) for preparation of the steel strip for its winding onto the central pipe (16) of the body (1) of the vessel and the arrangement (32) for tensioning the steel strip. The mill also comprises a fixture for welding the steel strip (2) to the end portions of the body (1) of the vessel and turns of the steel strip (2) to one another.

2 Claims, 3 Drawing Figures

MILL FOR MANUFACTURING BODIES OF MULTILAYER HIGH-PRESSURE VESSELS

TECHNICAL FIELD

The present invention relates to systems for manufacturing helical seam pipes and, more particularly, to mills for manufacturing bodies of multilayer high-pressure vessels.

BACKGROUND OF THE INVENTION

Multilayer high-pressure vessels manufactured by way of helical winding of a steel strip onto a central pipe in such a manner that every subsequent layer is placed in the direction opposite to that of the preceding one have no fastening welding seams or have only partial fastening in some outer layers of the steel strip. As a result, the strength of the high-pressure vessels depends on tightness of adherence of the strip layers to one another and accuracy of the steel strip winding. The tightness of adherence of the steel strip layers to one another and the accuracy of the steel strip winding depend, in their turn, on the value of tensioning of the steel strip being wound and the accuracy of adjustment of the angle of feeding of the steel strip to be wound. The rolled steel strip is inevitably crescent-shaped and has deviations in its width. Said deviations require an additional adjustment of the present angle of the steel strip winding in the course of winding. Therefore, rigidity and stability of the systems used for winding the steel strip, as well as an accurate adjustment and a fast correction of the parameters of the steel strip winding depending on current deviations in the shape of the steel strip are of a paramount importance during manufacture of bodies of multilayer high-pressure vessels.

Widely known is a plant for manufacturing helical seam pipes made of two strips (FRG Pat. No. 1222456; Class 7b, 37/12, published in 1962), which comprises a shaping unit bending the steel strip into a spiral and two technological lines for preparation of the steel strip, located at the opposite sides in relation to the pipe axis. Each technological line for preparation of the steel strip comprises a decoiler, drive rollers feeding the steel strip to the pipe, a straightening machine, an arrangement for cutting the steel strip, a fixture for butt welding of the ends of the steel strip and guide rollers, all arranged in succession along the direction of movement of the steel strip, all this equipment being mounted on a common frame installed on railways and capable of turning in the horizontal plane to change the angle of feeding of the steel strip during the winding thereof.

The afore-said device is characterized by a low accuracy of setting and adjustment of the angle of feeding of the steel strip because the process of setting and adjustment of the feeding angle of the steel strip necessitates a turn of the whole technological line for preparation of the steel strip, which is of a great weight and large dimensions. The plant under description used for manufacturing helical seam pipes occupies a considerable production area as the technological lines for preparation of the steel strip are located at the opposite sides of the pipe axis.

Also widely known is a mill for manufacturing bodies of multilayer high-pressure vessels (U.S. Pat. No. 2,600,630; Class 29-446, published in 1952), comprising rotators of the body of the high-pressure vessel, which have the butt end portions of the high-pressure vessel secured therein, and a technological line for preparation of the steel strip for its winding onto the vessel central pipe, the steel strip coming from a coil. The technological line for preparation of the steel strip comprises a decoiler, straightening rolls and guide rollers, all arranged in succession down the direction of movement of the steel strip. The technological line for preparation of the steel strip is mounted on a frame installed on a carriage moving along railways, the railways being positioned parallel to the high-pressure vessel body being wound at one side thereof, the movement of the carriage being mechanically matched to the rotation of the high-pressure vessel body. The frame mounting the technological line for preparation of the steel strip is made capable of turning in the horizontal plane to feed the strip to the vessel at a winding angle.

The mill also comprises an arrangement for tensioning the steel strip, which is mounted, relative to the axis of the vessel body, at an angle corresponding to the angle of winding of the steel strip and is movable along the high-pressure vessel body. The fixture for welding the steel strip to the end portions of the vessel body and turns of the steel strip to one another can also move relative to the vessel body.

The above-mentioned mill for manufacturing bodies of multilayer high-pressure vessels does not provide for a sufficient tightness and accuracy of winding of the steel strip because, when setting and adjusting the angle of winding of the steel strip, all the equipment of the technological line for preparation of the steel strip has to be turned around, this being still worse in case the layer of the steel strip is wound several times and in opposite directions. The fact that the carriage carrying the equipment of the technological line for preparation of the steel strip is mounted at one side of the high-pressure vessel body reduces rigidity and stability of the mechanical system of the mill during winding up of the body of a vessel of a big diameter when the tension of the steel strip is great. In the case of winding up of the bodies of vessels of great dimensions and weight the mechanical matching between the movement of the technological line for preparation of the steel strip along the high-pressure vessel body and the rotation of the body of the high-pressure vessel does not provide for an accurate winding of the steel strip owing to a low rigidity of the mechanical system of the mill being described. When changing the direction of winding of the steel strip, the equipment of the technological line for preparation of the steel strip has to be put at the other side, which results in wasted work time. Besides, every time a new layer is to be wound the end of the steel strip is chamfered at an angle which is a mirror reflection of the angle of winding of the previous layer, which brings about an excessive consumption of metal.

DISCLOSURE OF THE INVENTION

The present invention has as its object to provide a mill for manufacturing bodies of multilayer high-pressure vessels, in which a specific positioning of the technological line for preparation of the steel strip and the arrangement for tensioning the steel strip relative to the body of the high-pressure vessel provides for an improved quality of bodies of high-pressure vessels, and greater accuracy and tightness of adherence of layers of the steel strip of the body to one another.

This object is accomplished by that the mill for manufacturing bodies of multilayer high-pressure vessels, comprising rotators of the high-pressure vessel body, which have butt end portions of the high-pressure vessel body secured therein, a technological line for preparation of the steel strip coming from a coil for winding onto the central pipe of the vessel body, which can move along the body of the high-pressure vessel, an arrangement for tensioning the steel strip, which is mounted, relative to the axis of the vessel body, at an angle corresponding to the angle of winding of the steel strip and which can also move along the body of the high-pressure vessel, and a fixture for welding the steel strip to the end portions of the vessel body and turns of the steel strip to one another, which is also movable along the vessel body, which mill, according to the invention, additionally comprises a portal which surrounds the vessel body, can move along the latter and whose upper platform upholds a technological line for preparation of the steel strip for its winding onto the central pipe of the vessel body and a crossbar secured to uprights of the portal so that it can move vertically the mounts of the arrangement for tensioning the steel strip which can move along the crossbar and from which the steel strip is supplied to the upper generatrix of the vessel body in such a manner that a free loop of the steel strip allowing for a turn of the arrangement for tensioning the steel strip in the horizontal plane is formed between the technological line for preparation of the steel strip onto the central pipe of the vessel body and the arrangement for tensioning the steel strip.

In order to further raise the accuracy and tightness of adherence of layers of the steel strip to one another, it is expedient that the mill comprises an additional technological line for preparation of the steel strip for its winding onto the central pipe of the vessel body, disposed on the upper platform of the portal and an additional arrangement for tensioning the steel strip, disposed on the crossbar of the portal in the same horizontal plane as the main arrangement for tensioning the steel strip, the main and additional technological lines for preparation of the steel strip for its winding onto the central pipe of the vessel body being disposed, relative to the plane perpendicular to the axis of the vessel body, at an angle determined by the angle and direction of winding of the steel strip.

TECHNICAL AND ECONOMIC EFFECT

The mill for manufacturing bodies of multilayer high-pressure vessels provides for an accurate and tight winding of the steel strip as it is of a rigid and stable structure and performs adjustment of the angle of winding of the steel strip by way of displacement of the arrangement for tensioning the steel strip while the rest of the equipment remains stationary.

The mill is highly efficient as it allows for the reduction of the time required for preparation of the front end of the steel strip, setting and adjustment of the angle of winding of the steel strip, and to combine the operations of preparation of the steel strip in one technological line for preparation of the steel strip with the operations of winding the steel strip supplied from the other technological line for preparation of the steel strip.

Use of the mill makes it possible to reduce wastes of metal during preparation of the end portions of the steel strip for winding every subsequent layer by eliminating wastes when cutting beveled end portions of the steel strip.

Besides, use of the mill of the invention makes it possible to decrease the production area required for manufacture of bodies of multilayer high-pressure vessels.

BRIEF DESCRIPTION OF DRAWINGS

The present invention will be more readily understood from the following description of specific variants of its embodiment and drawings in which.

BEST MODE FOR CARRYING OUT THE INVENTION

Figure 1:
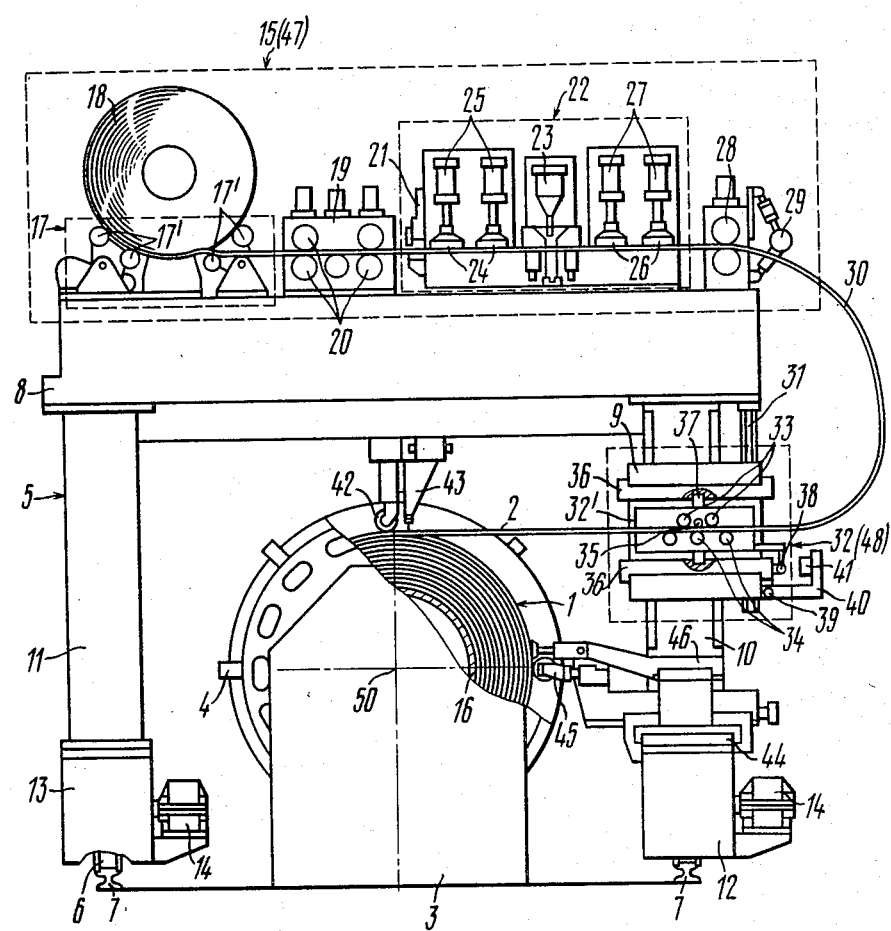
FIG. 1 shows a general view of the mill for manufacturing bodies of multilayer high-pressure vessels, having one technological line for preparation of the steel strip for its winding onto the central pipe of the vessel (a side view with a partial extraction), according to the invention.

A mill for manufacturing bodies 1 of multilayer high-pressure vessels, wound up of a steel strip 2, comprises rotators 3 of the body of the high-pressure vessel, whose chucks 4 have the butt end portions of the vessel body 1 secured therein. The mill also comprises a portal 5 which surrounds the high-pressure vessel body 1 being wound up and which is mounted on wheels 6 on a railway 7 capable of moving along the body 1 of the high-pressure vessel. The portal 5 comprises an upper working platform 8, a crossbar 9, front uprights 10 and rear uprights 11.

The front uprights 10 are interconnected by a beam 12 and the rear uprights 11 are interconnected by a beam 13, the beams 12 and 13 mounting drives 14 of the wheels 6 of the portal 5.

A technological line 15 for preparation of the steel strip 2 for its winding onto the central pipe 16 of the body 1 of the high-pressure vessel is mounted on the upper platform 8 of the portal 5 perpendicularly to the axis of the body 1 of the high-pressure vessel.

The technological line 15 for preparation of the steel strip comprises a decoiler 17 whose rollers 17' uphold a coil 18 of the steel strip 2. Further down the direction of movement of the steel strip 2 there is positioned a multiroll straightening machine 19 with rollers 20 between which the steel strip 2 is drawn. Installed behind the straightening machine 19 is a gas cutter 21 (not shown in the drawing) for cutting the steel strip 2. Farther down there is mounted a butt welding machine 22 which comprises an electric welding head 23, front clamps 24 of the end of the steel strip with hydraulic cylinders 25 disposed before the electric welding head 23 relative to the direction of movement of the strip 2 and rear clamps 26 with hydraulic cylinders 27 disposed behind the electric welding head 23 relative to the direction of movement of the steel strip 2. Disposed behind the butt welding machine 22 in relation to the direction of movement of the steel strip 2 are feed rollers 28 with a deflecting roller 29 used to form a loop 30 out of the steel strip 2 between the upper platform 8 and the crossbar 9 of the portal 5.

The crossbar 9 is secured to the front uprights 10 of the portal 5 and can move vertically with the aid of a screw mechanism 31 having a drive (not shown in the drawing).

The crossbar 9 carries an arrangement 32 for tensioning the steel strip, which is made as a multiroller machine, upper rollers 33 of the arrangement 32 for tensioning the steel strip being capable of moving vertically relative to lower rollers 34 to change the force of tensioning of the steel strip 2. The arrangement 32 for tensioning the steel strip also comprises a roller 35 disposed under one of the lower rollers 34 and used to feed the end of the steel strip 2 until the tensioning force is applied.

The arrangement 32 for tensioning the steel strip has a frame 32' which is mounted on sleds 36 with the aid of journals 37 and can be turned in the horizontal plane around the journals 37 by means of a hydraulic drive 38 mounted on the sleds 36 and coupled with the frame 32' of the arrangement 32 for tensioning the steel strip.

The sleds 36 are capable of moving along the crossbar 9 by means of a hydraulic drive 39 to decrease the transverse deformation of the loop 30 of the steel strip 2.

The hydraulic drive 39 is mounted on the crossbar 9 and is coupled with sleds 36 mounting the frame 32' of the arrangement 32 for tensioning the steel strip.

The crossbar 9 carries a platform 40 used for servicing and provided with a control panel 41.

Mounted from the bottom of the upper platform 8 of the portal 5 is a clamping device 42 and a fixture 43 for welding the steel strip 2 to the butt end portions of the body 1 of the high-pressure vessel and turns of the steel strip 2 to one another, which is installed for movement relative to the body 1 of the high-pressure vessel.

The lower beam 12 has thrust rollers 45 mounted in slide guides 44 and used to counterbalance the force of tensioning of the steel strip 2, acting upon the body 1 of the high-pressure vessel in the course of winding, and two milling heads 46 for machining weld seams.

There is possible another variant of embodiment of the mill for manufacturing bodies 1 of multilayer high-pressure vessels.

Figure 2:
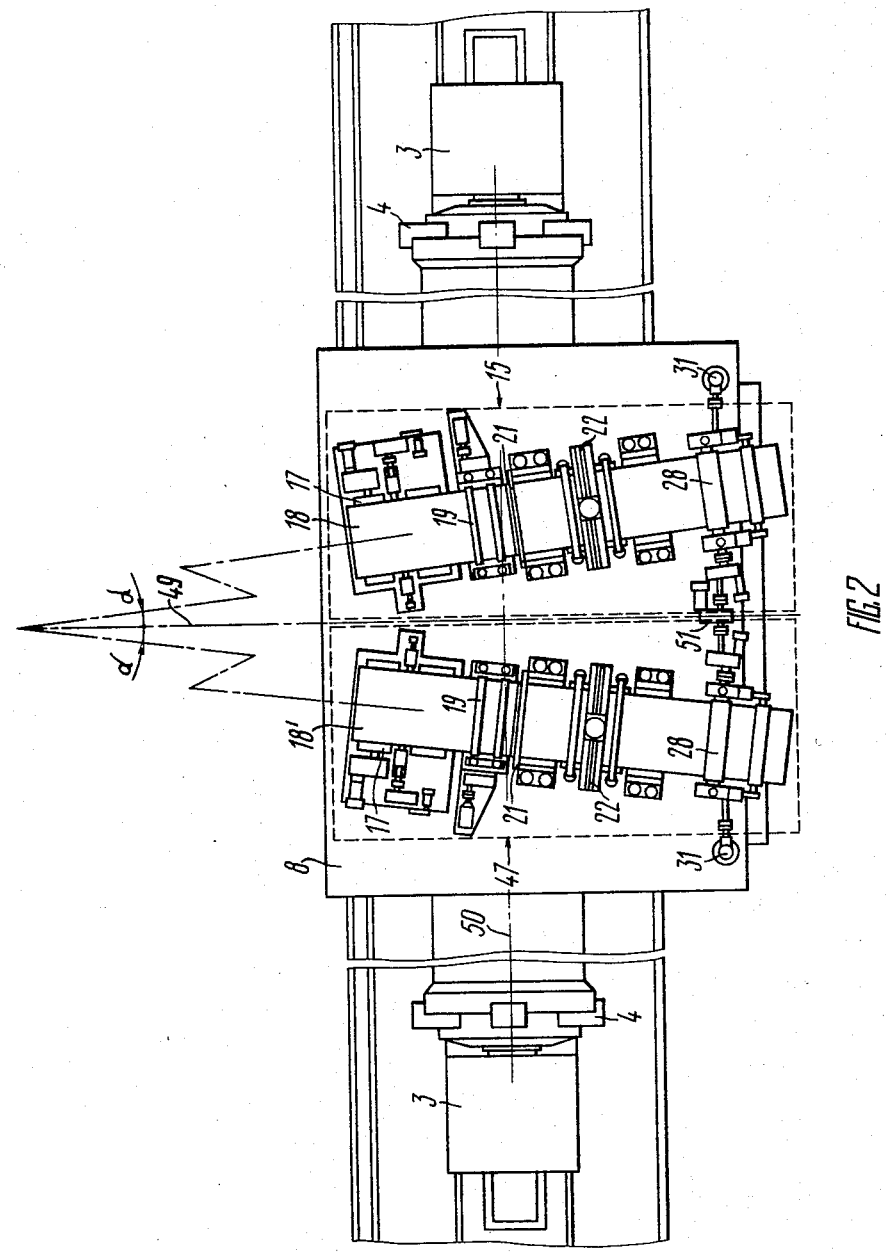
FIG. 2 shows a general view of another variant of embodiment of the mill for manufacturing bodies of multilayer high-pressure vessels, having two technological lines for preparation of the steel strip for winding onto the central pipe of the vessel (a top view), according to the invention.
Figure 3:
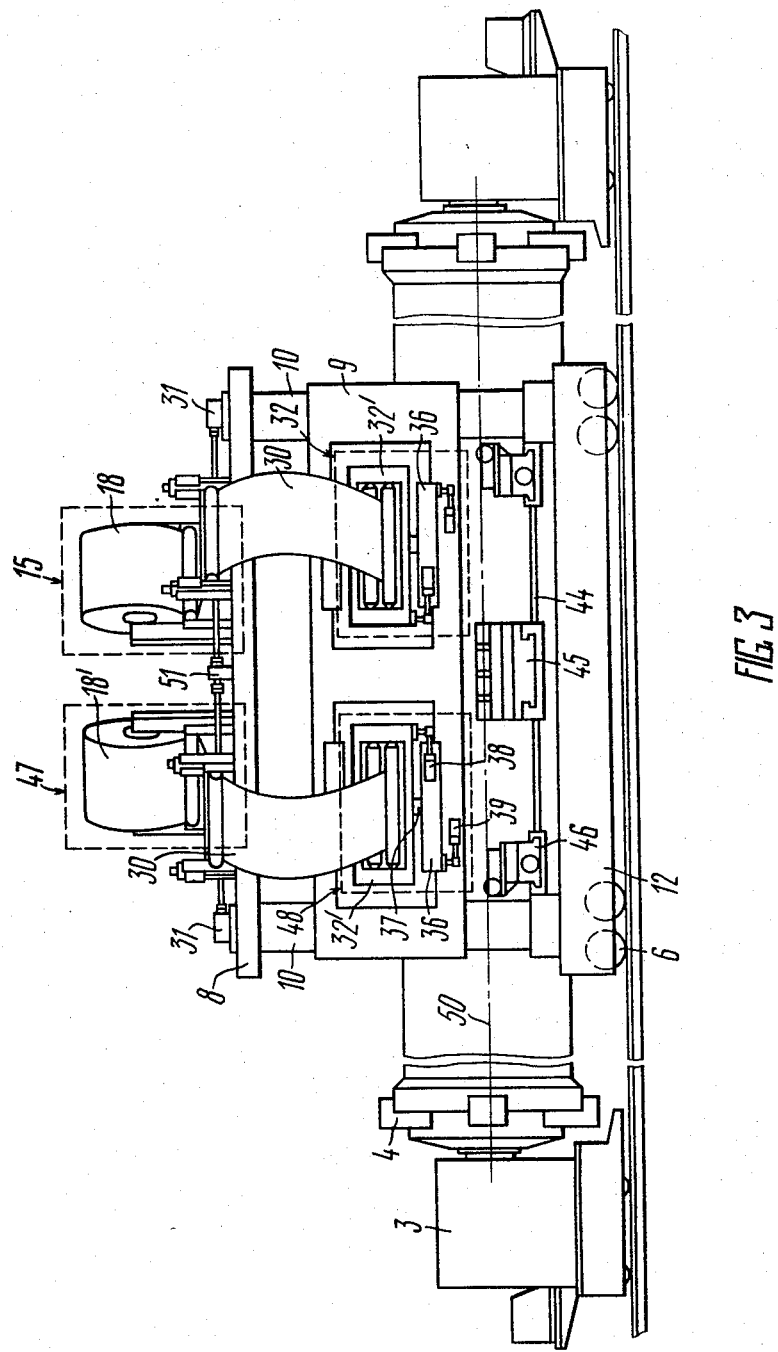
FIG. 3 shows a general view of the mill for winding up bodies of multilayer high-pressure vessels, with two technological lines for preparation of the steel strip (a front view), according to the invention.

In this case the mill comprises all the afore-described units plus an additional technological line 47 (FIG. 2) also mounted on the upper platform 8 of the portal 5, and an additional arrangement 48 for tensioning the steel strip (FIG. 3) which is also mounted on the crossbar 9 in the same horizontal plane as the main arrangement 32 for tensioning the steel strip, the main technological line 15 (FIG. 2) for preparation of the steel strip and the additional technological line 47 for preparation of the steel strip being disposed at an angle $\alpha$ relative to a plane 49 perpendicular to an axis 50 of the body 1 of the high-pressure vessel.

The angle $\alpha$ is determined by the angle of winding of the steel strip 2, and, when manufacturing the bodies 1 of high-pressure vessels with different angles of winding of the steel strip, the angle $\alpha$ is chosen as a mean value between the maximal and minimal values of the angle of winding of the steel strip to decrease bending of the loop 30 of the steel strip 2 in the transverse direction.

With respect to the plane 49, the technological lines 15 and 47 for preparation of the steel strip are turned in opposite directions, the main technological line 15 for preparation of the steel strip being used during winding in one direction, e.g. from left to right, and the additional technological line 47 for preparation of the steel strip being used during winding in the opposite direction, e.g. from right to left. Like the main technological line 15 for preparation of the steel strip, the additional technological line 47 for preparation of the steel strip also comprises a decoiler 17. Arranged farther down the direction of movement of the steel strip 2 is the multiroller straightening machine 19 with the rollers 20 (FIG. 1) between which the steel strip 2 is drawn. Mounted behind the straightening machine 19 (FIG. 2) is the gas cutter 21 cutting the steel strip 2. Mounted further down the direction of movement of the steel strip is the butt welding machine which comprises the electric welding head 23, the front clamps 24 for the ends of the steel strip, provided with the hydraulic cylinders 25 and the rear clamps 26 provided with the hydraulic cylinders 27. Disposed behind the butt welding machine 22 relative to the direction of movement of the steel strip 2 are the feed rollers 28 provided with the deflecting rollers 29, rollers 17' of the decoiler 17 of the technological line 47 mounting another coil 18' of the steel strip 2.

The additional arrangement 48 (FIG. 3) for tensioning the steel strip is made similar to the main arrangement 32 for tensioning the steel strip as a multiroller machine and is also mounted on the sleds 36 with the aid of the journals 37. It is provided with the individual hydraulic drive 38 used for turning the arrangement 48 for tensioning the steel strip around the journals 37, and with the hydraulic drive 39 moving the arrangement 48 along the crossbar 9.

The hydraulic drive 38 is mounted on the sleds 36 and is connected with the frame 32' of the arrangement 32 for tensioning the steel strip. The hydraulic drive 39 is mounted on the crossbar 9 and is connected with the sleds 36 mounting the frame 32' of the arrangement 32 for tensioning the steel strip.

The screw mechanisms 31 (FIG. 2) used for moving vertically the crossbar 9 are kinematically interconnected and have a common drive 51.

The mill for manufacturing the bodies 1 of multilayer high-pressure vessels operates as follows.

The butt end portions of the body 1 of the high-pressure vessel, welded to the central pipe 16 onto which the steel strip 2 is wound are secured in the chucks 4 (FIG. 1) of the rotators 3.

The coil 18 of the steel strip 2 is placed onto the decoiler 17, and the steel strip 2 is fed from the decoiler 17 owing to rotation of the rollers 17' into the straightening machine 19 in which the rollers 20 straighten the steel strip 2, and feed it through the cutter 21 in which it is cut at the angle of winding of the first layer from one longitudinal edge to the other one in such a manner that the length of the cut equals the length of the outer circumference of the central pipe 16. Then, the steel strip 2 is passed through the butt welding machine 22 to the feed rollers 28. The deflecting roller 29 of the feed rollers 28 deflects the steel strip 2 downwards to form the loop 30 and feeds it into the space between the rollers of the arrangement 32 for tensioning the steel strip, with the formed wastes of the steel strip 2 being simultaneously removed from the mill.

The steel strip 2 is pressed by the roller 35 against one of the drive rollers 34 and is fed farther to the central pipe 16.

The crossbar 9 with the arrangement 32 for tensioning the steel strip and the steel strip 2 are moved vertically by the screw mechanisms 31 until the steel strip 2 touches the upper generatrix of the central pipe 16.

The hydraulic drive 38 turns the arrangement 32 for tensioning the steel strip through the angle of winding. While being turned around the journals 37, the arrangement 32 for tensioning the steel strip is additionally moved on the sleds 36 along the crossbar 9 by the hydraulic drive 39. The arrangement 32 for tensioning the steel strip is moved along the crossbar 9 to decrease transverse deformation of the loop 30 of the steel strip 2.

By moving the portal 5 the cut edge of the steel strip 2 is brought to the left-hand butt end portion of the body 1 of the multilayer high-pressure vessel. The end of the steel strip 2 is spot-welded to the butt end portion of the body 1 of the high-pressure vessel by the fixture 43 for welding the steel strip, the clamping device 42 is brought down onto the fixed end of the steel strip 2, the rotators 3 are started up and the beveled edge of the steel strip 2 is welded by the fixture 43 to the butt end portion of the body 1 of the high-pressure vessel along the length of a complete circumference. With the end of the steel strip 2 welded thereto, the steel strip is tensioned by lowering the upper rollers 33 between the front rollers 34. Then, the thrust rollers 45 are brought up to the side surface of the central pipe 16, and further winding of the steel strip 2 is accompanied by simultaneous and synchronized rotation of the body 1 of the vessel and translational movement of the portal 5 along the axis 50 of the vessel body 1. By the torque created by the rotators 3 the steel strip 2 is drawn from the arrangement 32 and is wound onto the central pipe 16 with some tension.

In case the steel strip 2 starts having deviations in its width or aquiring a crescent shape, as well as in order to prevent one turn from running over another and to maintain a preset gap between the edges of the adjacent turns, the angle of winding is corrected by turning the arrangement 32 for tensioning the steel strip 2 around the journals 37 with the aid of the hydraulic drive 38. Whenever necessary, the arrangement 32 for tensioning the steel strip is moved along the crossbar 9 by means of the hydraulic drive 39. Before winding of the first layer is completed the gas cutter 21 is switched on to cut off the steel strip 2 at the angle of winding of the first layer to shape the rear end of the steel strip 2 of the first layer, whereupon the steel strip 2 is cut off at the angle of winding of the second layer to shape the front end of the steel strip 2 of the second layer.

Thereupon, the decoiler 17 and the multiroller straightening machine 19 are stopped and the rear end of the steel strip 2 is wound onto the central pipe 16 until the beginning of the cut reaches the right-hand butt end portion of the body 1 of the high-pressure vessel, whereupon the translational movement of the portal 5 is discontinued and the cut edge is welded to the right-hand butt end portion of the body 1 of the high-pressure vessel under the clamping force of the device 42.

Prior to winding of another layer of the steel strip 2 the both weld seams are machined by the milling heads 46 during rotation of the body 1 of the high-pressure vessel. To wind the second layer, the decoiler 17 and the straightening machine 19 are started, the steel strip 2 shaped at the angle of winding is brought through the butt welding machine 22 to the feed rollers 28, the deflecting roller 29 forms the loop 30 from the steel strip 2 and, at the same time, wastes of the steel strip 2 are removed from the mill. The steel strip 2 is fed into the arrangement 32 for tensioning the steel strip and is brought up to the upper generatrix of the cylindrical surface of the first layer of the vessel body 1 as it has been described before.

The hydraulic drive 38 turns the arrangement 32 for tensioning the steel strip through the angle of winding of the second layer, which arrangement 32 is simultaneously moved along the crossbar 9.

By moving the portal 5, the cut-off edge of the steel strip 2 is brought up to the right-hand butt end portion of the body 1 of the high-pressure vessel and is welded to the right-hand butt end portion of the body 1 of the high-pressure vessel in the sequence described before.

The steel strip 2 is tensioned and further wound while the body 1 of the high-pressure vessel is constantly rotated and the portal 5 is translationally moving in the reverse direction.

The rear end of the steel strip 2 of the second layer is shaped and welded to the left-hand butt end portion in the same sequence as described for the first layer.

All the subsequent layers of the steel strip 2 are wound and welded in the same manner.

As manufacture of one multilayer body 1 of the high-pressure vessel requires several coils of the steel strip 2, the ends of the steel strips 2 are welded together in the course of winding.

For this, the ends of the steel strips 2 to be joined are preliminarily cut off and are then welded together in the butt welding machine 22. During their cutting-off and welding together the ends of the steel strips 2 are pressed by the respective clamps 24 and 26 with the aid of the hydraulic cylinders 25, 27.

If necessary, layers of the steel strip 2 are welded together along the edges of the adjacent turns by the fixture 43, the weld seams being machined by the milling heads 46.

During the operation of the mill for manufacturing the bodies 1 of multilayer high-pressure vessels, comprising the additional technological line 47 (FIGS. 2, 3) for preparation of the steel strip 2 and the additional arrangement 48 for tensioning the steel strip, the steel strip 2 wound in one direction is fed from the main technological line 15 through the main arrangement 32 for tensioning the steel strip, whereas the steel strip 2 wound in the opposite direction is fed from the additional technological line 47 through the additional arrangement 48 for tensioning the steel strip 2.

Thereby, the steel strip 2 is cut off in the cutter 21 without changing the direction of the cut relative to the edges of the steel strip 2 for each of the technological lines 15, 47 for preparation of the steel strip.

Employment of the main and additional arrangements 32 and 48 (FIG. 3) for tensioning the steel strip eliminates the operation of their turning in the horizontal plane when changing the direction of winding. The hydraulic drives 38 turn slightly the arrangements 32 and 48 for the mere purpose of correcting the angle of winding of the steel strip 2 when passing over from one layer to another and in the cases of deviations in the width of the steel strip or appearance of the crescent shape, which, in its turn, brings down the necessity for additional movement of the arrangements 32 and 48 for tensioning the steel strip along the crossbar 9.

Use of the mill for manufacturing bodies of high-pressure vessels makes it possible to increase the number of layers of the steel strip wound helically in opposite directions and provides, at the same time, high accuracy and tightness of the winding, thereby improving reliability of high-pressure vessels and safety of their operation.

The mill for manufacturing bodies of high-pressure vessels makes it possible to raise labour efficiency, and to reduce the production area and consumption of metal.

Industrial Applicability

The present invention can be used in machine building when manufacturing from a steel strip multilayer high-pressure vessels such as columns for synthesis of ammonia, carbamide and methanol, reactors for hydraulic cracking of petroleum products, apparatus for heat- and mass-exchange under high pressure of nuclear reactions.

We claim:

1. A mill for manufacturing bodies of multilayer high-pressure vessels, said mill comprising: a high-pressure vessel having a body in the form of a central pipe including butt end portions; means to rotate the high-pressure vessel, said butt end portions of the high-pressure vessel secured in said rotating means; a technological line for preparation of a steel strip for its winding onto the central pipe, said technological line being movable along the body of the high-pressure vessel, said steel strip coming from a coil; first tensioning means for tensioning the steel strip and pivotally mounted in a plane tangential to the vessel body and at an angle relative to the axis of the vessel body, said angle corresponding to the angle of winding of the steel strip, said tensioning means being also movable axially along the body of the high-pressure vessel and including a plurality of rollers disposed on opposite sides of the steel strip and movable toward and away from each other to change the tension in the strip between the tensioning means and the vessel body; a fixture for welding the steel strip to the end portions of the vessel body and for welding turns of the steel strip to one another and mounted to move along the vessel body; a portal which surrounds the body of the vessel and is movable along the body of the vessel, said portal including an upper platform to support said technological line for preparation of the steel strip for its winding onto the central pipe of the vessel and a crossbar secured to uprights of the portal and movable vertically; said tensioning means carried by and movable along a crossbar that extends along the exterior of the vessel and from which tensioning means the steel strip is supplied to the upper generatrix of the body of the vessel in such a manner that a free loop of the steel strip allows for pivoting of the tensioning means relative to the axis of the vessel body, said free loop formed between the technological line and the tensioning means.

2. A mill according to claim 1, including an additional technological line for preparation of the steel strip for its winding onto the central pipe of the body of the vessel and disposed on the upper platform of the portal; second means for tensioning the steel strip disposed on the cross-bar of the portal in the same horizontal plane as the first means for tensioning the steel strip, said technological lines being positioned, relative to the plane perpendicular to the axis of the body of the vessel, at an angle determined by the angle and direction of winding of the steel strip.

* * * * *